(12) United States Patent
Antaki

(10) Patent No.: US 8,664,503 B2
(45) Date of Patent: Mar. 4, 2014

(54) MUSICAL NOTATION AND METHOD OF TEACHING SAME

(75) Inventor: James F. Antaki, Pittsburgh, PA (US)

(73) Assignee: AntakaMatics, Inc., Pittsburgh, PA (US)

( * ) Notice: Subject to any disclaimer, the term of this patent is extended or adjusted under 35 U.S.C. 154(b) by 161 days.

(21) Appl. No.: 13/208,510

(22) Filed: Aug. 12, 2011

(65) Prior Publication Data
US 2012/0036980 A1 Feb. 16, 2012

Related U.S. Application Data

(60) Provisional application No. 61/373,697, filed on Aug. 13, 2010.

(51) Int. Cl.
G09B 15/02 (2006.01)
(52) U.S. Cl.
USPC .......................................... 84/483.2
(58) Field of Classification Search
USPC .................. 84/470 R, 483.1, 483.2, 471 SR
See application file for complete search history.

(56) References Cited

U.S. PATENT DOCUMENTS

| 5,309,812 | A * | 5/1994 | Shelton ........................ 84/471 R |
| 5,824,927 | A | 10/1998 | Tonon |
| 6,326,532 | B1 | 12/2001 | Antaki |
| 6,501,011 | B2 | 12/2002 | Wesley |
| 6,870,085 | B2 | 3/2005 | MacCutcheon |
| 7,030,307 | B2 | 4/2006 | Wedel |
| 7,423,213 | B2 | 9/2008 | Sitrick |
| 7,423,214 | B2 | 9/2008 | Reynolds et al. |
| 7,444,353 | B1 | 10/2008 | Chen et al. |
| 7,446,253 | B2 | 11/2008 | Knapp et al. |
| 7,482,525 | B2 | 1/2009 | Reverdin |
| 7,485,793 | B1 | 2/2009 | Divine |
| 7,518,057 | B2 | 4/2009 | Worrall et al. |
| 7,525,033 | B2 | 4/2009 | Lance |
| 7,541,536 | B2 | 6/2009 | Daniel |
| 7,612,278 | B2 | 11/2009 | Sitrick et al. |
| 7,667,125 | B2 | 2/2010 | Taub |

(Continued)

FOREIGN PATENT DOCUMENTS

| WO | WO9323846 A1 | 10/1993 |
| WO | WO0143116 A1 | 6/2001 |
| WO | WO02101687 A1 | 12/2002 |
| WO | WO2010059994 A2 | 5/2010 |

OTHER PUBLICATIONS http://harptabs.com; Printed Aug. 11, 2011.
http://harmopoint.com; Printed Aug. 11, 2011.

(Continued)

Primary Examiner — Kimberly Lockett
(74) Attorney, Agent, or Firm — Acker Wood IP Law, LLC; Gwen R. Acker Wood

(57) ABSTRACT

The invention provides an apparatus and method for notating music for a harmonica. The apparatus incorporates a vertical staff in which vertical lines or tracks represent individual notes, the length of which represents duration of the note, and the horizontal location represents the physical location of the corresponding hole in a harmonica. The invention provides a rapid means of learning to play a harmonica and, for experienced players, provides a means for sight reading a new piece of music. The invention further provides ways of representing the dynamics of both pitch and loudness and a convenient way to manually transcribe musical selection for archival purposes.

6 Claims, 14 Drawing Sheets

(56) References Cited

U.S. PATENT DOCUMENTS

| | | |
|---|---|---|
| 7,692,081 B2 | 4/2010 | Bauer et al. |
| 7,696,421 B1 | 4/2010 | Charles |
| 7,714,222 B2 | 5/2010 | Taub et al. |
| 7,723,599 B2 | 5/2010 | Braun et al. |
| 7,723,600 B2 | 5/2010 | Braun et al. |
| 7,739,595 B2 | 6/2010 | Salter |
| 7,750,224 B1 | 7/2010 | Rav-Niv et al. |
| 7,982,115 B2 * | 7/2011 | Johnston ............ 84/483.2 |
| 2002/0050206 A1 | 5/2002 | MacCutcheon |
| 2002/0134223 A1 | 9/2002 | Wesley |

OTHER PUBLICATIONS http://www.softpicks.net; Printed Aug. 11, 2011.
httjp://www.patmissin.com; Printed Aug. 11, 2011.
http://www.google.com/search?q=quadratnotation&hl=en&biw=1582&bih=715&prmd=ivns&tbm=isch&tbo=u&source=univ&sa=X&ej=w2BFTtXeEM3pgQfGIZnQBg&sqi=2&ved=0CCgQsAQ; Printed Aug. 11, 2011.

* cited by examiner

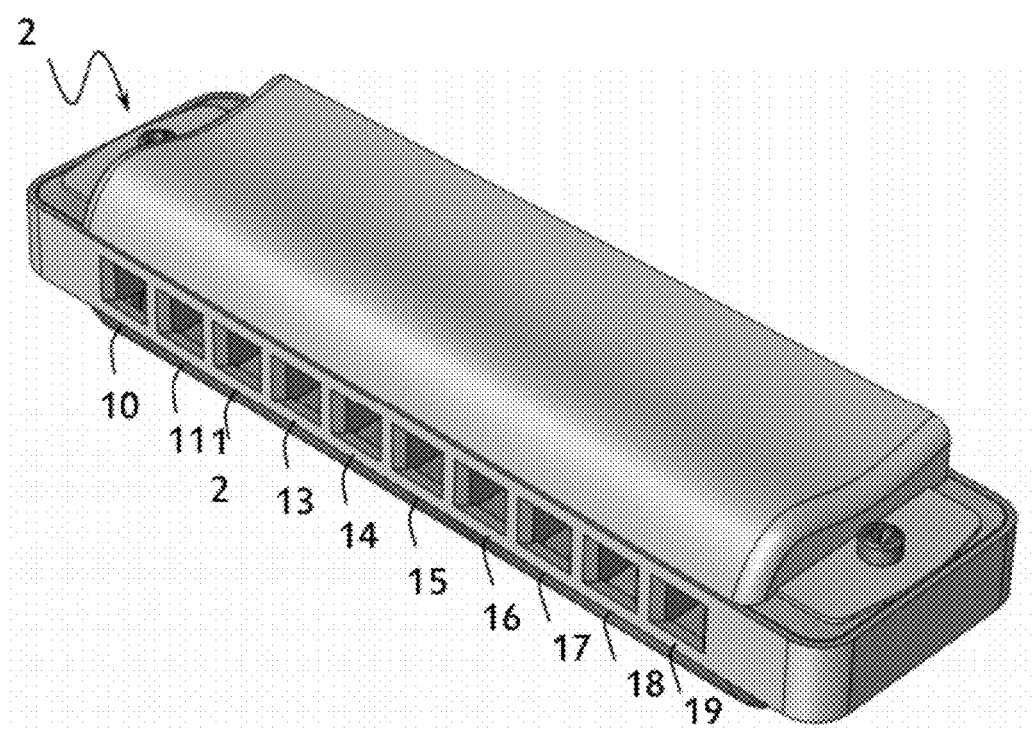
Fig. 1 - Prior Art

"Oh Suzanna"
A
```
4B 4D 5B 6B 6B 6D 6B 5B 4B
4D 5B 5B 4D 4B 4D
4B 4D 5B 6B 6B 6D 6B 5B 4B
4D 5B 5B 4D 4D 5B
4B 4D 5B 5D 5D 6D 6D
6D 6B 6B 5B 4B 4D
4B 4D 5B 6B 6B 6D 6B 5B 4B
4D 5B 5B 4D 4D 4B
```
B 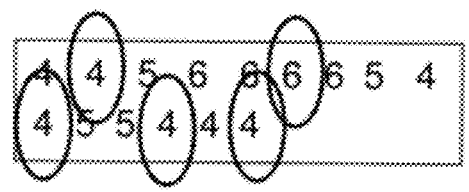
C 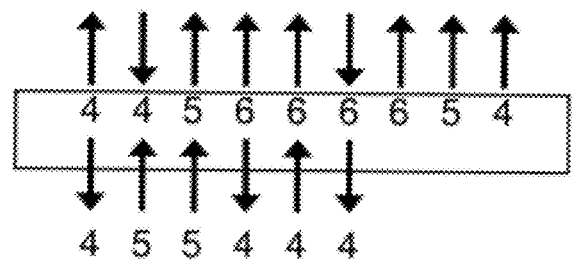
Fig. 2 - Prior Art D 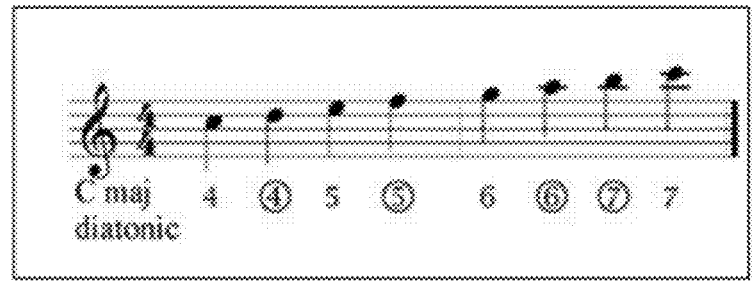
E 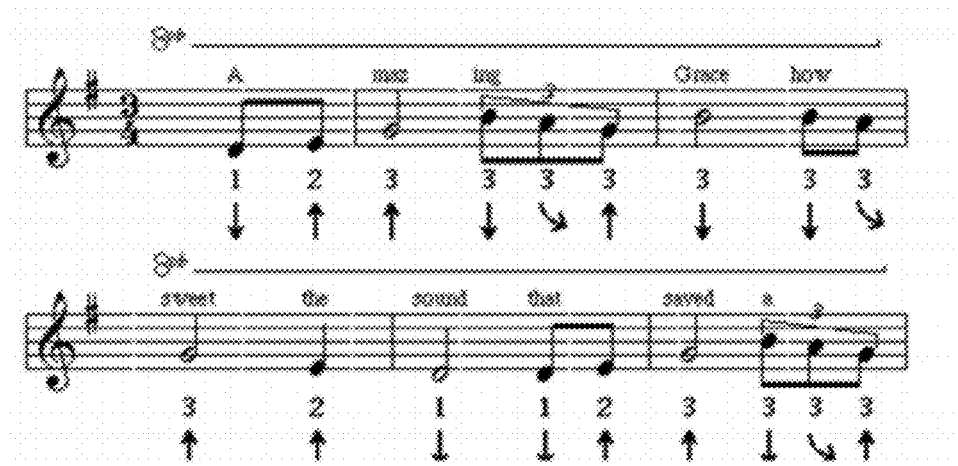
Fig. 2 (continued)

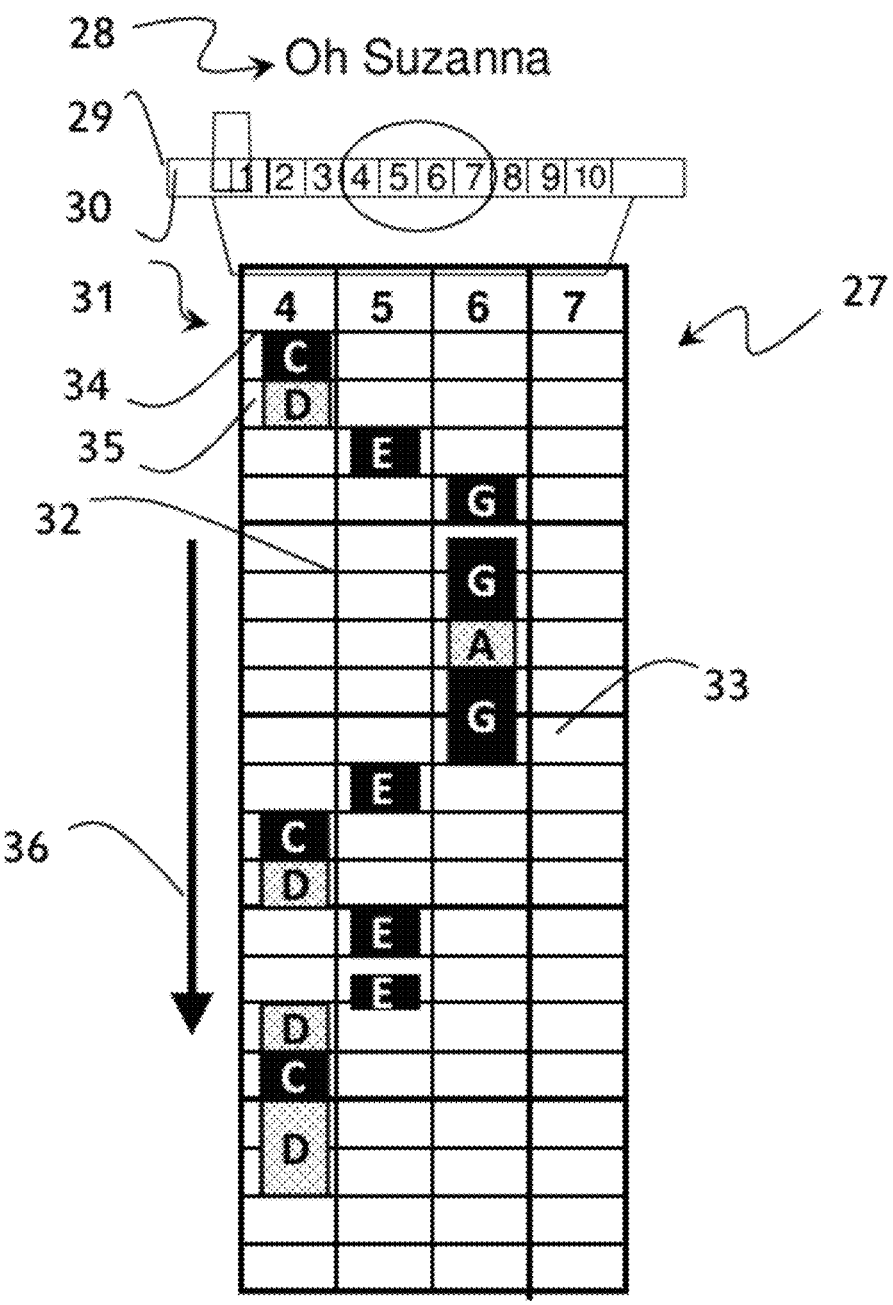
Fig. 3
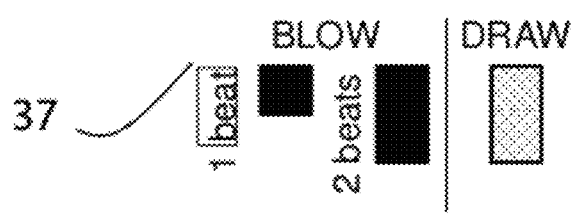

B

C

A

C

MUSICAL NOTATION AND METHOD OF TEACHING SAME

The present application claims priority to U.S. Provisional Patent Application No. 61/373,697, filed Aug. 13, 2010, which is incorporated herein by reference.

FIELD OF THE INVENTION

The invention relates to musical instruction and, more particularly, to notating music for musical instruments, such as a harmonica.

BACKGROUND OF THE INVENTION

Musical instruments typically are learned through a combination of written instructions, audio, and visual examples. Written instruction may be typically provided by a book, pamphlet, blackboard, or electronic means, such as a computer. Audio and visual feedback may be provided in a variety of ways: from a human instructor in real-time, from recorded instruction, or from recorded music.

The learning process typically may be conducted in one of two approaches: (1) trial and error, whereby a student listens to a musical selection and attempts to emulate through various actions, perhaps arbitrary at first, until a satisfactory result occurs; or (2) note-by-note, whereby a student "reads" some form of musical notation provided either in a classical format or in "tablature" format and then must translate text to a physical operation on the instrument by blowing through a hole, pressing a key, fingering a fretboard, etc. Some modern, advanced instructional systems provide more direct instruction, for example, by lighting keys of a keyboard.

For example, a typical harmonica is shown in FIG. 1. The harmonica is a handheld instrument, preferably fabricated of a combination of wood, resinous plastic, metal, and/or other suitable material. The harmonica contains several sound holes 10-19 into which a player blows air or from which a player draws air to produce a number of different tones. One popular form of harmonica is a ten hole diatonic harmonica which provides two notes per hole, although there are numerous variations having different numbers of holes, and reeds per hole. The Richter-tuned harmonica, the most widely known type of harmonica, is tuned such that the blow notes comprise a tonic triad (e.g. C-E-G for a harmonica tuned to the key of C) and the draw notes provide a dominant (G major) chord. Because the standard diatonic harmonica only is designed to be played in a single key at a time, diatonic harmonicas are available in all keys.

Because of its relatively low cost and simplicity, amongst other reasons, the harmonica appeals to a wide variety of people, from young children to senior citizens, many (most) of which are not familiar with standard musical notation. Therefore, it is common to represent a musical selection for the harmonica using a more simplified means, known as tablature. Use of tablature dates back to the 1300's and has been developed for a wide variety of instruments, including the guitar, lute, harmonica, and others. It is characteristically designed to represent the physical layout of the instrument, such as the frets of a guitar or holes of a lute.

As an example, a common form of tablature for the harmonica, shown in FIG. 2A, is known as "B/D" and provides an alphanumeric series in which the numerals, e.g. 1, 2, 3 . . . 10, each representing their specific sound hole, are appended with the letter "B" or "D" to indicate whether a note is to he blown or drawn. This form has several limitations. It does not necessarily convey the tempo of the selection or duration of the individual notes. It furthermore cannot easily convey if a note is "bent" or overblown/overdrawn, although variations exist in which additional demarcations are added to the alphanumeric.

A further limitation of this tablature relates to the translation by a student from numeral and letter to physical position of the lips on the instrument and manner of drawing or blowing. In other words, there is an additional cognitive step involved to convert the number-letter pairing to physical motion of hands, lips, tongue, diaphragm, etc. It therefore is not intuitive.

A closely related tablature is shown in FIG. 2B, which involves the use of a combination of circled and un-circled numerals to indicate blow and draw notes, replacing "B" and "D" in the previous example. This form of tablature suffers the same limitations as described above.

Another common. form of tablature, shown in FIG. 2C, provides a series of numerals combined with arrows. An upward pointing arrow typically indicates a blown note, and a down arrow a note that is drawn. A curved or bent arrow indicates that a particular note is bent. Multiple arrowheads are used to indicate degree of bending (half, whole step, etc.) Various additional ad hoc demarcations are employed to indicate other maneuvers such as overblows, trills, etc. This means of tablature suffers most of the limitations of those previously described.

A further limitation of the aforementioned forms of tablature is that they do not necessarily indicate the note associated with the alphanumeric character. Consequently, it is not uncommon to juxtapose standard musical notation and harmonica tablature, as shown, for example, in FIG. 2D and FIG. 2E.

A yet further limitation of the aforementioned forms of tablature is that they do not provide any indication of the position of the hands, commonly used by harmonica musicians to modulate the tone, and/or to mute the sound, to achieve a musical effect commonly known as "hand cupping."

Limitations of the Prior Art

Printed Media: sheet music, books, electronic text and diagrams
  a. Written musical notation or tablature does not provide complete information for reproducing a musical selection. It fails to provide precise dynamics, including loudness, modulation of pitch (e.g. tremolo), timbre (overtones) and tempo (e.g. syncopation), which collectively represent the "expression" of the musician. This is evidenced by two musicians correctly playing the exact same selection of music, yet sounding very different. Consequently, a student may never be able to achieve the "sound" he/she is seeking.
  b. The absence of audio (aural) instruction is a significant handicap. Without audio, it is difficult to determine tempo and expression (timbre, vibrato, tremolo, dynamics, etc.)

Human Instruction
  a. A human instructor, although highly valuable, is costly and only is available for a very limited amount of time, typically one hour per week.
  b. A human instructor may not necessarily be able to reproduce the performance of the "master" musician, whom the student may wish to emulate.
  c. A human instructor cannot necessarily express verbally or diagrammatically the precise techniques he/she is utilizing—sometimes subconsciously. In particular, the instructor typically is unable to describe his/her embouchure employed to achieve common effects such as bending, overblowing, vibrato and tremolo.

Recorded Media—Provided through CDs, tapes, computer program, or website
  a. Audio instructional media (e.g. tapes, CDs) are awkward. They require the student to use an electronic sound reproduction device, (e.g. CD player or computer) and to press a sequence of buttons in addition to the instrument being learned. For example:
    i. press 'play," listen to sample;
    ii. press "pause," attempt to repeat/emulate;
    iii. press "rewind," and "play" again to compare.
  b. This is time consuming, forces the student to remove hands from an instrument to operate the reproduction device and limits the speed and efficiency of comparing the reference selection to the student's attempt.
  c. It is typically not possible to both play and record at the same time using the same device. If a student wishes to compare his/her attempt to a reference example, a separate recording device is needed, involving yet additional complexity and wasted motions.

A Recording Device—it is not uncommon for a student to record one's own musical performance to be replayed at a later time for evaluation, allowing the student to hear the limitations, mistakes, etc. of the student's performance. However, because feedback of the performance is delayed, the student's ability to evaluate his/her performance is limited.

Therefore, there is a need for an automatic, interactive method of musical instruction that provides audio examples, audio feedback, the ability to record and replay a student's musical attempt, and means for comparing the latter to a reference example.

Furthermore, there is a need for an improved form of visual notation, or tablature, which corresponds more closely to the motions required to play an instrument, such as a harmonica, which is more intuitive and contains information about pitch, tempo and, generally, dynamics.

SUMMARY OF THE INVENTION

The present invention fulfills these needs by providing, in one embodiment, an iconographic tablature for notating music for a harmonica. The tablature comprises a staff having a head portion and a tail portion. The staff is aligned in a vertical direction which reflects progression of time. A plurality of numerals is located at the head of the staff, each numeral representing one hole of the harmonica. There is at least one elongated demarcation aligned in the vertical direction, in which the vertical dimension of the at least one elongated demarcation reflects duration of time that a note is to be played on the harmonica. The horizontal position of the at least one elongated demarcation indicates the hole of the harmonica in which it is to be played.

The color or pattern of the elongated demarcation indicates whether the note is blown or drawn. The elongated demarcation has a shape which varies horizontally which depicts modulation of pitch of the note, and has a variable width, variable intensity or variable hue, each of which indicates loudness of the note.

The tablature further comprises at least one other elongated demarcation superimposed on the at least one elongated demarcation. The at least one other elongated demarcation indicates notes played by a player, e.g., musician or student.

In another embodiment, there is provided a device for recording and reproduction, such as a digital recorder/player. The device comprises an electronic memory, an audio output portion, such as a speaker and/or headphones, at least one switch, and an electronic circuit. The device is capable of playing one and up to about one thousand pre-recorded musical selections and also is capable of recording a player's musical attempt after hearing one of the pre-recorded musical selections.

The device allows for the recording of the player's musical attempt to begin automatically after hearing the pre-recorded musical selection. The device then plays back the pre-recorded musical selection and/or the recording of the player's musical attempt. The speed of the playback of the pre-recorded musical selection and/or the player's musical attempt can be slowed down without a change of pitch.

The device further comprises simultaneously playing background rhythm music while recording the player's musical attempt.

The device can be integrated within a printed instructional book or into a musical instrument.

The device further comprises a visual graphic screen which provides a graphical depiction of tempo, pitch, loudness, and/or timbre of the playback of the pre-recorded musical selection and/or the playback of the player's musical attempt. The graphical depiction of the playback of the player's musical attempt can he superimposed on the playback of the pre-recorded musical selection. The graphical screen also allows for textual instructions or the name of the pre-recorded musical selection to be shown.

In a further embodiment, there is provided a method of teaching a musical instrument. The method comprises using a recording and playback device to play a pre-recorded musical selection. Following the playing of the pre-recorded musical selection, a player's attempt of the pre-recorded musical selection is recorded on the device. The pre-recorded musical selection and/or the recording of the player's musical attempt of the pre-recorded musical selection then is replayed. The player or the player's teacher then compares the player's musical attempt to the pre-recorded musical selection.

BRIEF DESCRIPTION OF THE DRAWINGS

A full understanding of the present invention can be gained from the following detailed description of non-limiting embodiments when read in conjunction with the accompanying drawings in which:

FIG. 1 is an exploded, isometric view of a prior art diatonic harmonica;

FIG. 2A-E provides examples of prior art methods for representing musical notation for the harmonica;

FIG. 3 is an example of musical notation for the harmonica in accordance with a non-limiting embodiment of the present invention illustrating the introduction to the popular folk song "Oh Suzanna;"

FIG. 6 illustrates interactive aspects of the present invention, in which FIG. 6A is an example of the various components of an interactive embodiment of the present invention; and FIG. 6B and 6C illustrates examples of interactive versions of the tablature of the present invention;

FIG. 8 illustrates embodiments of the present invention integrated or associated with other components, in which FIG. 8A shows a recording/playing device integrated with printed music, for example a music book; FIG. 8B shows a recording/playing device provided in association with printed music, for example a music book; and FIG. 8C illustrates the system programmed into a portable tablet computer.

DETAILED DESCRIPTION OF THE INVENTION

Figure 4:
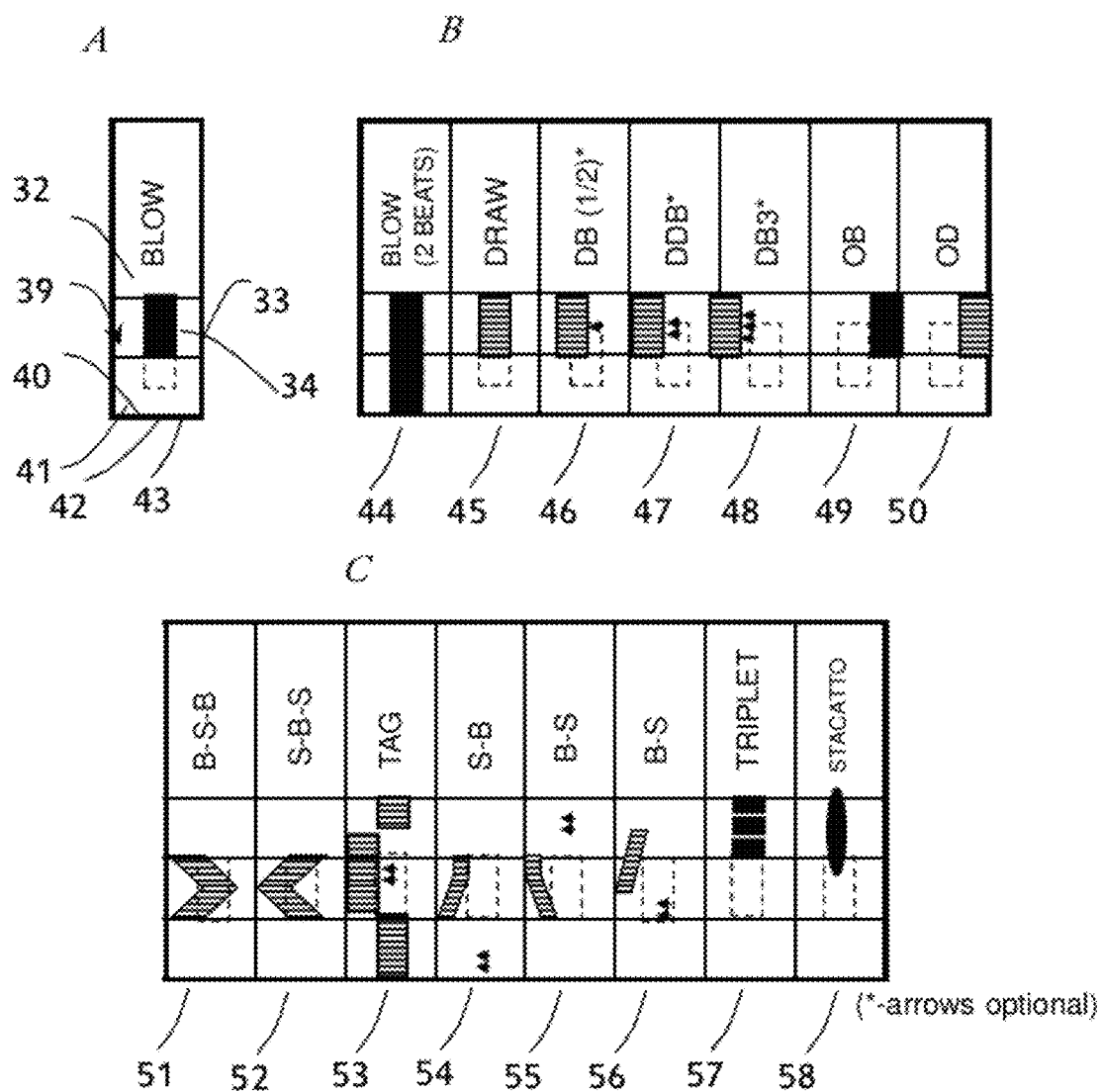
FIG. 4A-D is a non-limiting collection of musical symbols in accordance with the present invention illustrating several of the most common techniques used on the harmonica.
Figure 4:
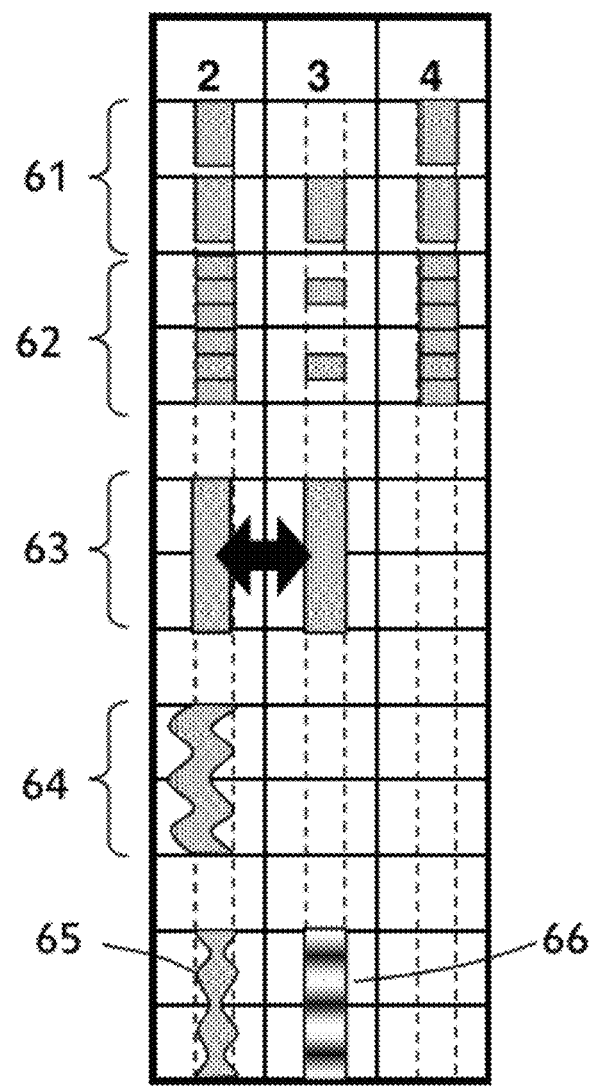

The present invention provides a means for playing a reference musical selection, recording a player's attempt, and comparing the two to provide corrective feedback to the player.

Various aspects of the invention described herein may be applied to any of the particular applications set forth below. It shall be understood that different aspects of the invention can be appreciated individually, collectively or in combination with each other.

As used herein, the terms "student," "musician," and "player" are interchangeable and are defined as a person who plays, or attempts to play, a musical instrument.

Referring now to FIG. 3, an example of musical notation for the harmonica in accordance with a non-limiting embodiment of the present invention is shown. It provides for a musical staff, generally indicated by 27, comprising a grid of orthogonal lines, having a height greater than its width, principally aligned in the vertical direction such that the downward direction refers to the progression of time, and the horizontal direction refers to the location of the holes of the harmonica 2. The vertical lines, such as line 32, demarcate the boundary between individual holes of the harmonica. Horizontal lines such as line 33 may be provided to indicate the meter, or duration of musical beat. A header 31 may be provided indicating the numbering of a selection of holes of the harmonica. A corresponding schematic diagram 29 may be provided above the header in which the associated holes of the particular musical piece may be indicated, for example by an ellipse 30. The title of the selection 28 may also be provided in a convenient location adjacent to the tablature.

Upon the musical staff 27 are provided geometric shapes which may comprise squares or rectangles such as 34 and 35 or any suitable shape, in which the vertical dimension indicates the duration of the note and the horizontal position, relative to the header and vertical lines indicates the physical location of the sound hole to be played. The name of the note (A, B, C, etc.) also may be appended to the geometric shape, within or adjacent thereto. The distinction between notes that are "blown" and those that are "drawn" can be made by alternating the color, outline, or pattern of the geometric shapes. A non-limiting example would be to provide as solid shape 34 to indicate a note that is blown and a patterned shape 35 to indicate a note that is drawn. A legend 37 may also be provided to assist the interpretation of the tablature.

As appreciated by those skilled in the art, it is possible to alter the pitch of a note by modifying the vocal tract. Flattening (lowering) of pitch is known as a "bend" and sharping (raising) the pitch is known as an "overblow," "overdraw" or collectively "overbend."

Referring now to FIG. 4, a non-limiting collection of musical symbols in accordance with the present invention is illustrated. It should first be appreciated that the lines 32 and 33 of staff 27 comprise a collection of individual cells, each cell delimited by two such vertical lines and two horizontal lines. By reference to FIG. 4A, it may be further appreciated that each cell may be further subdivided into three sub-regions, 41, 42, 43. The use of a dashed line 40 may be used to demarcate the three associated sub-regions, or columns. Such sub-regions may permit the representation of altered pitch within any given hole. For example, a straight blow note may be represented by a symbol located in the central third 42 of the cell. A blow note of longer duration, comprising two beats, is illustrated by a lengthened symbol, 44. A straight or natural draw note 45 is likewise indicated by a symbol of different color, texture, etc. in the central third region.

A note which is bent may be demarcated by a symbol that is shifted leftwards, a distance proportional to the degree of flatting of the note. For example, a draw note that is shifted by one half step, known as a "draw bend" DB may be indicated by a symbol 46 shifted leftward by one half the width of the sub-region, or one sixth of the total width of cell. Likewise a note that is flatted by two half steps, known as a "double draw bend" DDB may be indicated by a symbol 47 shifted leftward by a full width of the sub-region, or one third of the total width of cell. A draw note that is flatted by three half steps, known as a "triple draw bend" DB3 may be indicated by a symbol 48 shifted leftward by a one-and a half width of the sub-region, or three sixths the total width of cell. To further indicate the amount of leftward shift, arrows may be added, one arrow per half step of flatting of the note.

In a similar fashion, notes that are sharped by the procedure of overblowing OB or overdrawing OD may be indicated by a rightward shift of the symbol 49, 50.

Referring now to FIG. 4C, it can be appreciated that any note whose pitch is altered while blowing or drawing may be indicated by an appropriately deflected symbol. A non-limiting example is a note that is first bent, then unbent, and bent again, indicated as B-S-B, which may be indicated by a symbol 51 which begins in the leftward third of the cell, deflects to the central third, and back to the leftward third.

It may be appreciated that any variety of bending, blowing, drawing and/or timing may be combined to achieve musically desirable effects, such as a tag 53, a straight note that is bent S-B 54, a bent .note that is straightened B-S 55, a note that is continuously and smoothly bent from beginning to end 56, or a triplet 57.

It can be appreciated that a variety of shapes such as circles 58 may be used to illustrate the duration and pitch of a note, and that a number of distinguishing features such as hue, intensity, saturation, width, outline etc. may be provided to convey additional information including pitch, loudness, tremolo, timbre, embouchure, etc.

Referring now to FIG. 4D, it is illustrated that multiple holes of a harmonica may be played simultaneously, and likewise indicated by the present invention by an analogous set of multiple symbols positioned side by side. For example a maneuver known as a "vamp," in which the embouchure is shaped to play three holes simultaneously, and the tongue is used to intermittently block the middle hole, may be illustrated by a set of two non-adjacent symbols followed by three adjacent symbols 61, 63. A procedure known as a "warble," whereby the player's head is shaken sideways to alternately play adjacent notes, may be indicated by two parallel symbols connected by an arrow 63. A procedure known as tremolo, in which the pitch is rapidly modulated by repetitive bending of the note, may be indicated by a serpentine symbol 64. A procedure known as vibrato, wherein the loudness of the note is rapidly modulated, may be indicated by a symbol of varying width 65 or intensity 66.

Figure 5:
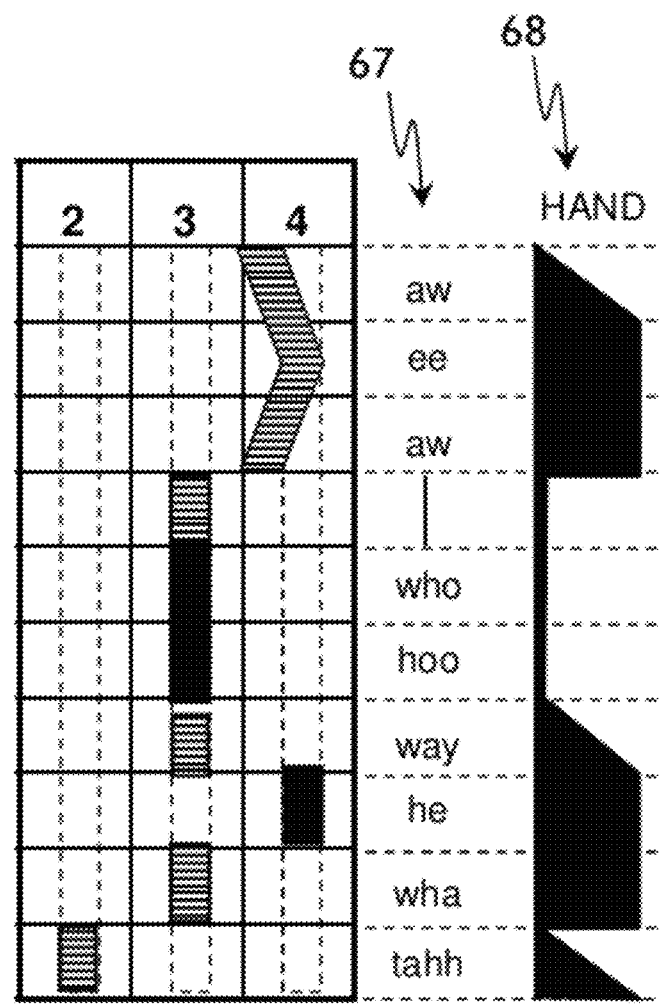
FIG. 5 is an example of musical notation for the harmonica in accordance with a non-limiting embodiment of the present invention illustrating the addition of embouchure and hand cupping instructions.

Referring now to FIG. 5, another embodiment of the present invention is shown in which additional instructions are appended that relate to the player's embouchure and hand position, both affecting the timbre of the sound produced. The embouchure, specifically the position of the tongue and jaw, is represented by appropriate vowel sounds or phrases, shown generally at 67. Likewise, the position of the hand, specifically the degree of cupping or blockage of the instrument by the hands, is illustrated by a stripe of varying width located adjacent to, and principally aligned with, the notes of the staff. In the present non-limiting example, a line of lesser (thinner) width indicates that the player shall cover the harmonica with his/her hands thereby muting the sound; the larger width implies that the player shall open or remove his/her hands from blocking the instrument.

Figure 6:
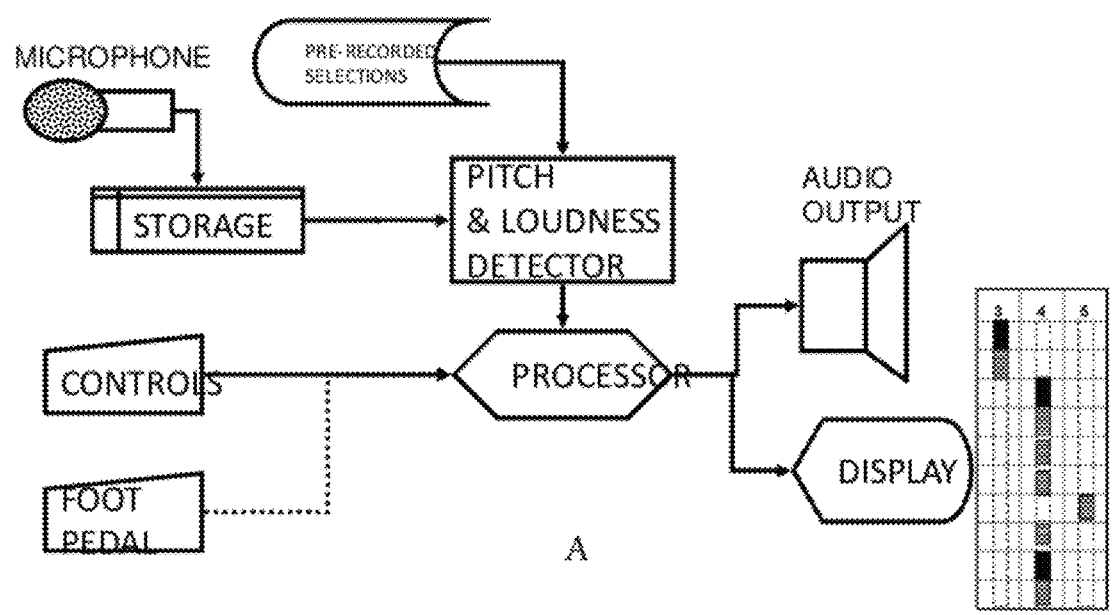
Figure 6:
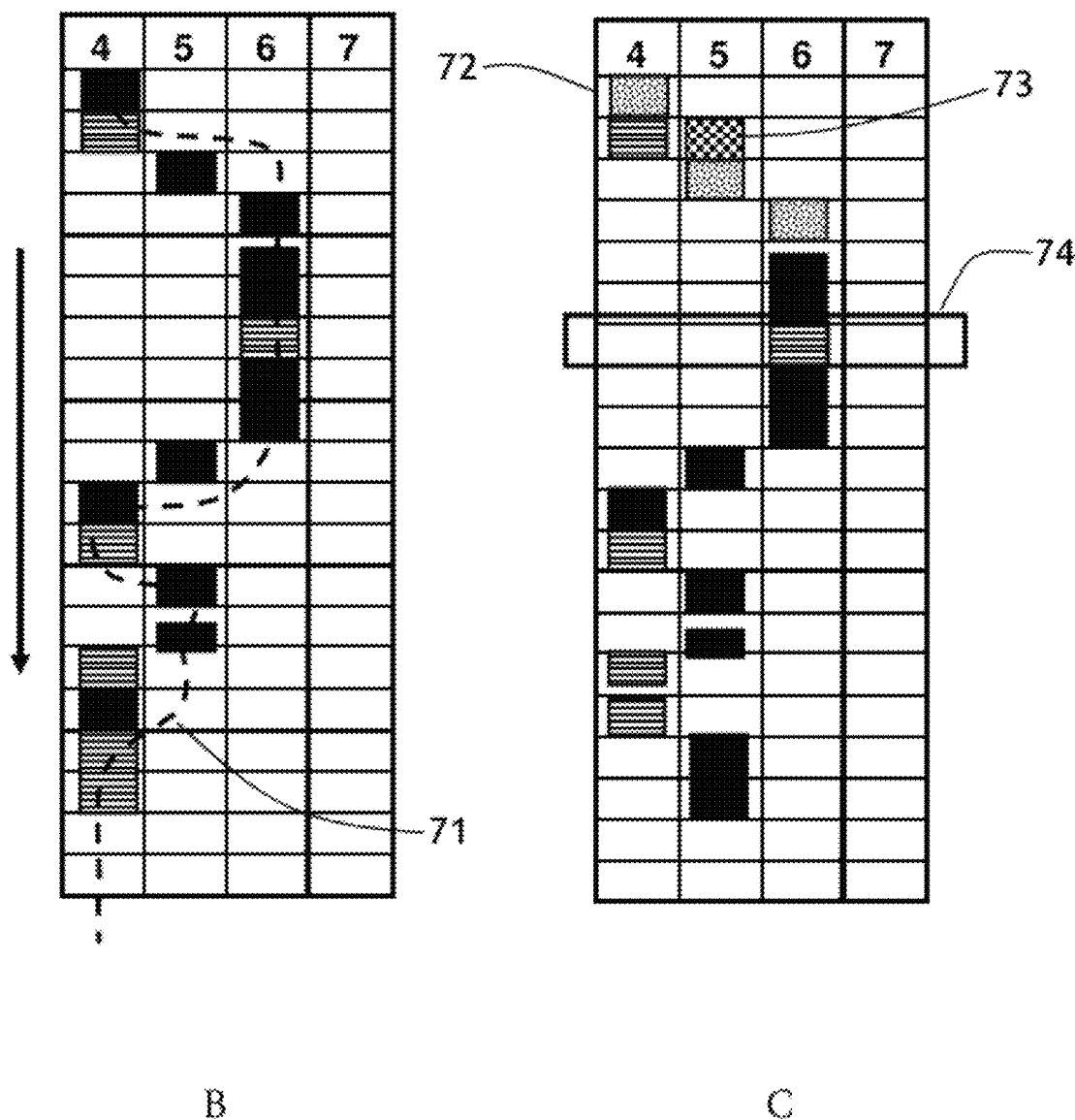
Figure 6:
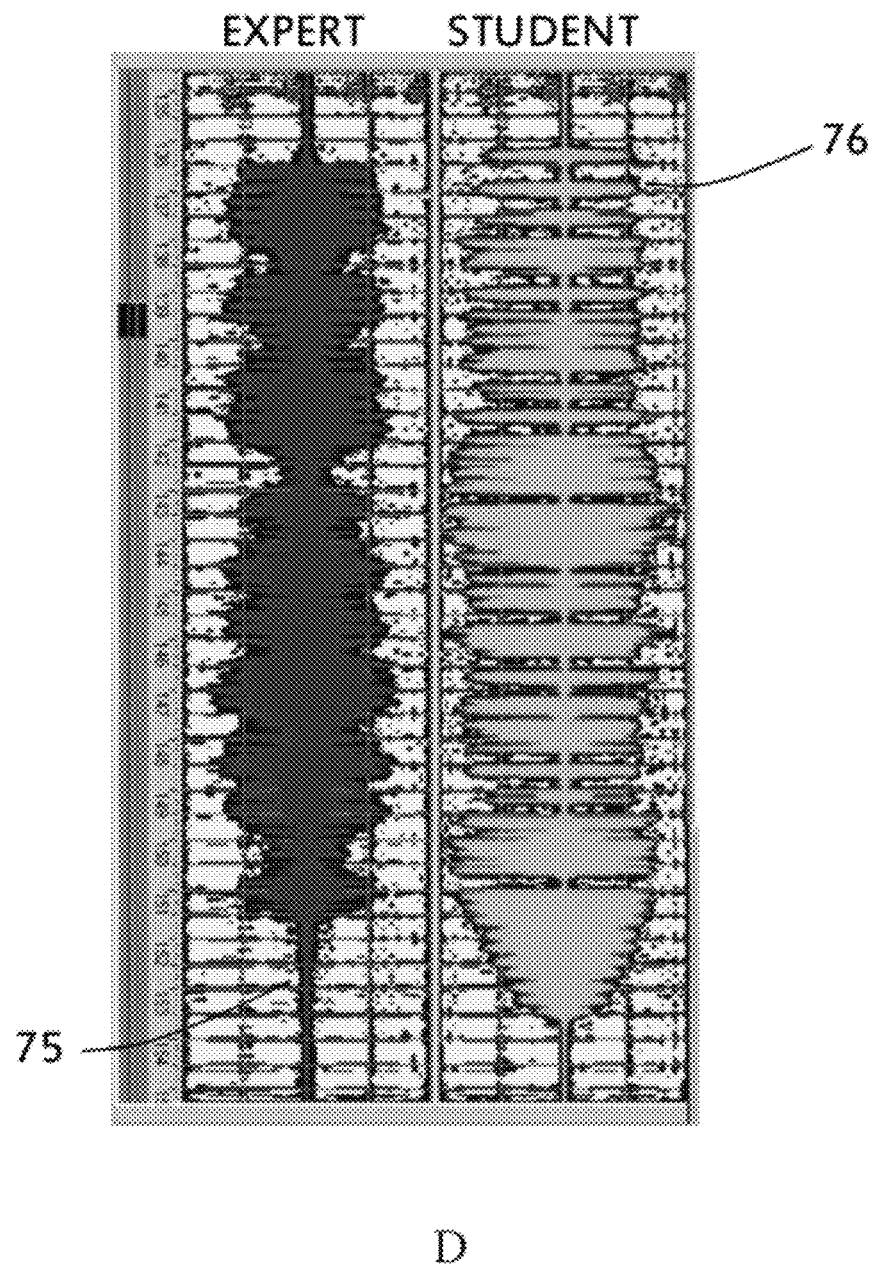

Referring now to FIG. 6A, there is illustrated the various components of an interactive embodiment of the present invention, which is comprised of a means for playing a pre-recorded selection of music, a means of recording and replaying the student's attempted reproduction of the benchmark selection, a means of extracting the pitch and loudness of the selection, and a visual display for depicting the associated tablature of the selection. User controls may be provided to make selections of pre-recorded music and to set various parameters such as choice of mode, speed, loudness, etc. A foot pedal may also be provided to provide hands-free control of the starting, stopping, and looping of the recording of playback. Specific embodiments of these various components, and the interconnection thereof, should be familiar to those skilled in the art.

Referring now to FIG. 6B and 6C, which shows examples of an interactive form of tablature according to the current invention, it may be appreciated that the musical recording by the player may be superimposed upon the reference tablature to illustrate the accuracy of the player's attempt. This may be depicted by a "bird seed" path 71, shown as colored or shaded symbols 72, 73 indicating correct and incorrect notes. An emphasized, animated region 74 may be provided to indicate the current time point in the musical selection. FIG. 6D illustrates a further sophisticated graphical display providing dynamic information of the loudness of the reference recording 75 juxtaposed with the player's recording 76.

There may be several modes by which the present invention may provide kedback to the student. One example is a simple note-by-note mode in which the player must play the correct note, but need not be concerned with timing thereof. A second more advanced mode would compel the player to play in sync with the tempo of the selection, in which the tempo could be adjustable in speed to permit the student to start slowly and gradually reach full speed. A third yet further advanced mode would provide dynamic information, such as loudness and timbre.

Figure 7:
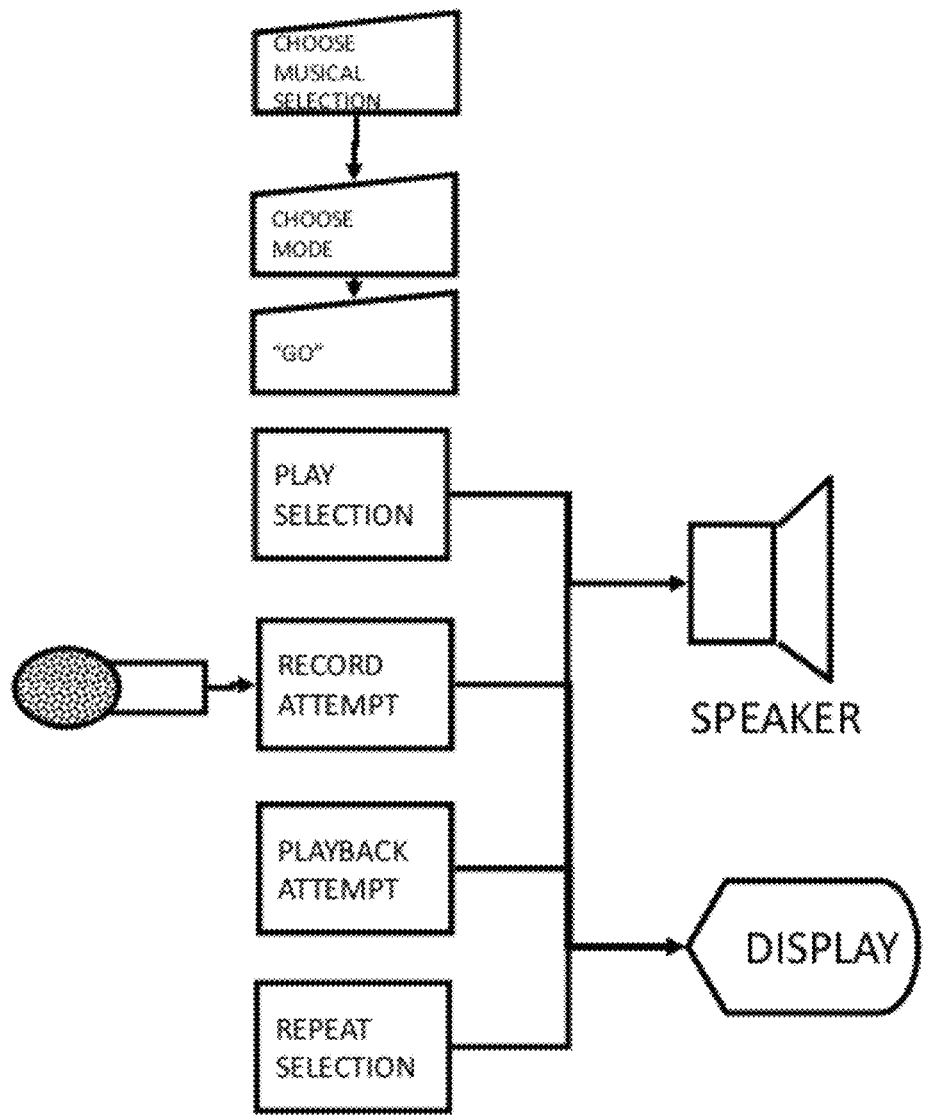
FIG. 7 shows a flowchart of a typical sequence of operations performed by a musician or student using the interactive embodiment of the present invention.

Referring now to FIG. 7, a flowchart is provided illustrating a typical sequence of operations by the musician of student using the interactive embodiments of the present invention. He/she would choose a musical selection from a menu, play a recording of a professional playing the selection and visually review the tablature, then record his/her attempted reproduction of the selection, which in turn would be automatically played back after a delay. The playback may he automatically looped (repeated) a number of times prescribed by the musician, or controlled by a foot pedal.

Figure 8:
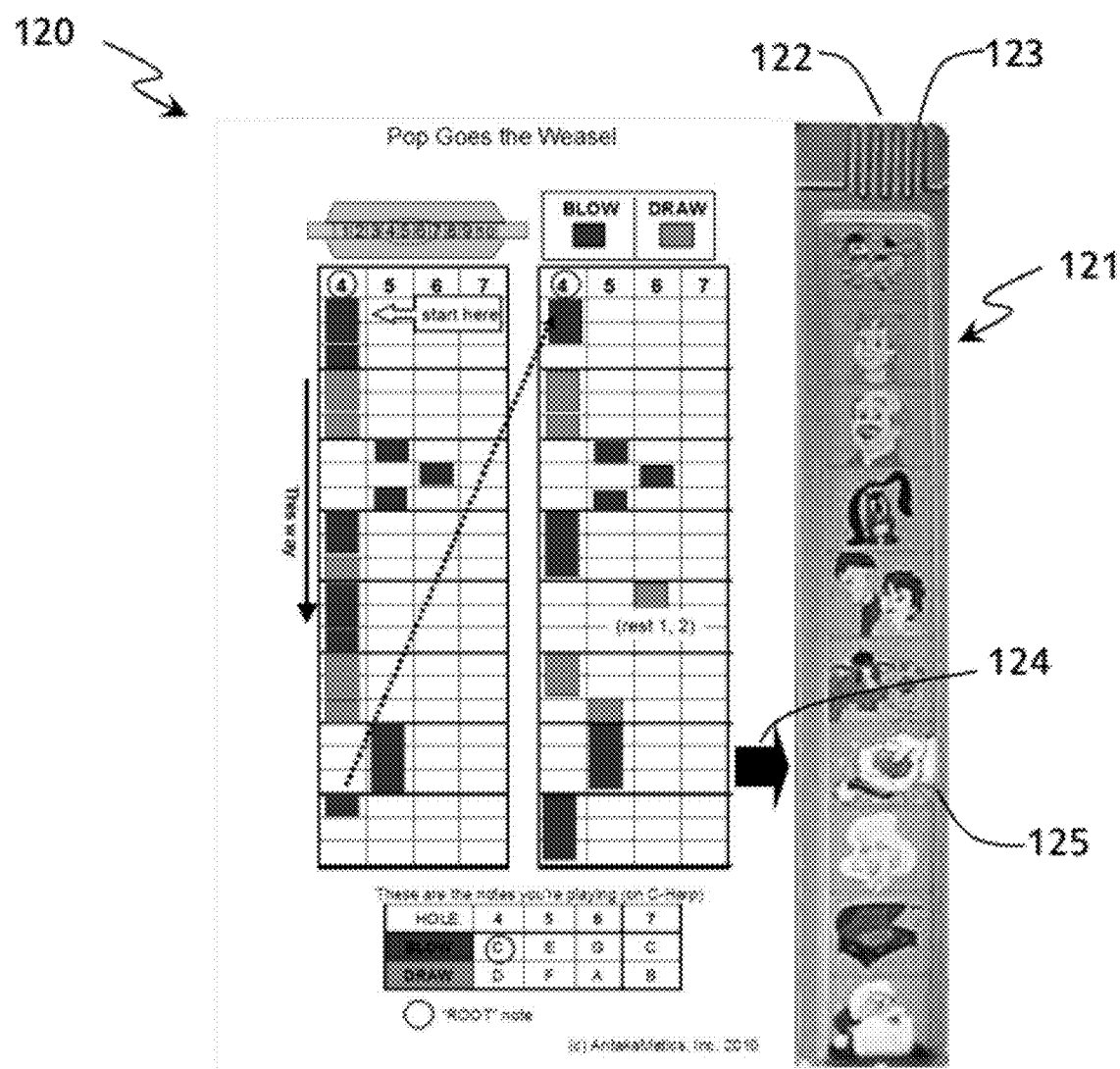
Figure 8:
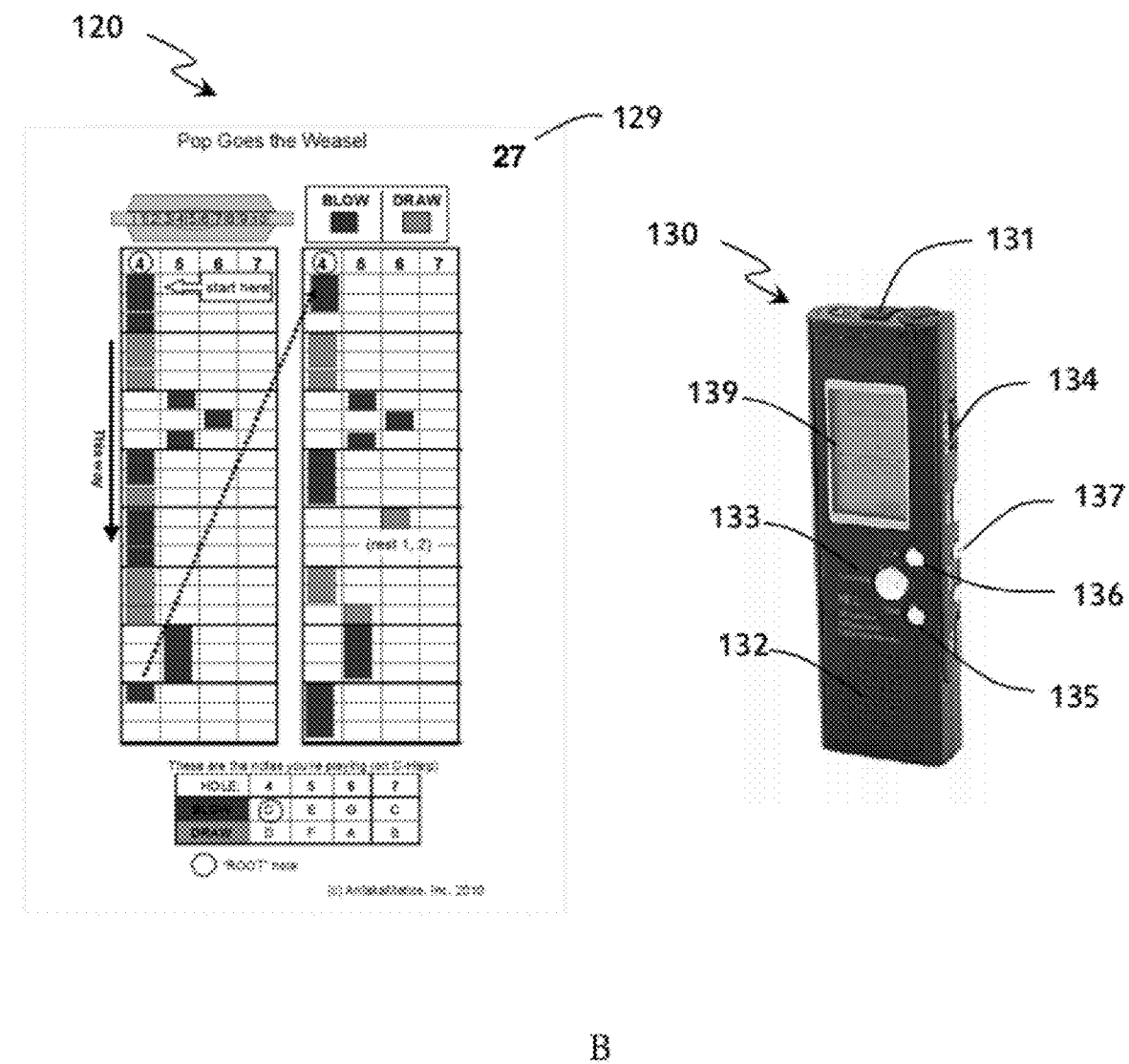
Figure 8:
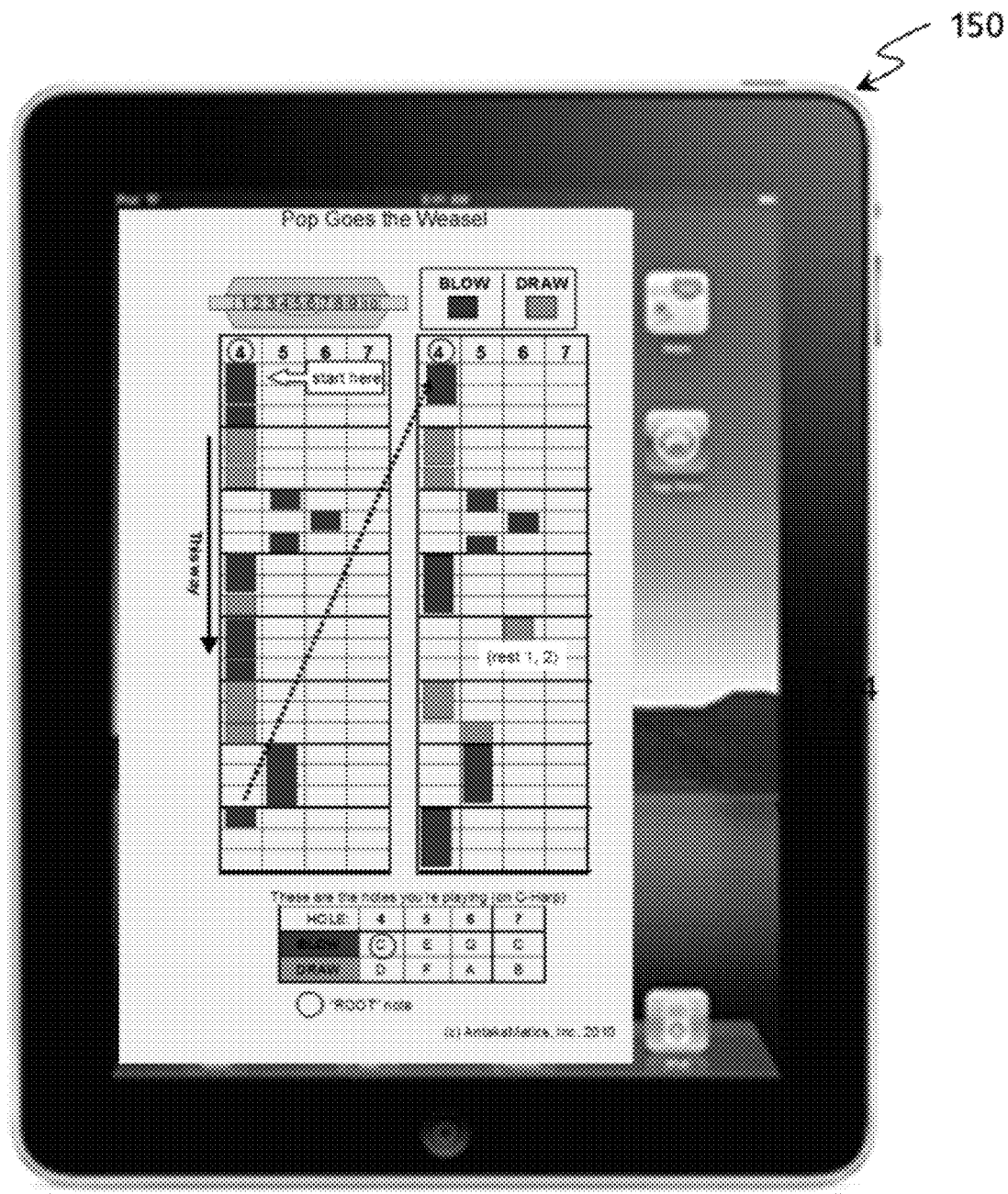

Referring now to FIG. 8A, which illustrates a further embodiment of the interactive version of the present invention generally shown by 120, there is provided a recording/playing device 121 integrated with printed tablature, for example a music book. The recording device comprises a microphone 122 and speaker 123 and a number of controls 125 for playing a selection, indicated by some suitable demarcation such as an arrow 124 on the printed music.

Referring now to FIG. 8B, it can be appreciated that the recording device 130 comprising a microphone 131 and speaker 132 may be a separate component from the printed material 129. The recording device may provide controls for looping 133, browsing musical selections 134, recording 135, playing 136, loudness 137, and graphical display 139 which provides instructions or other feedback to the player.

Referring now to FIG. 8C, there is illustrated yet another embodiment of the interactive version of the present invention, in which a recording/playing device is programmed into a portable tablet computer 150 comprising a collection of pre-recorded musical selections, an associated tablature, an electronic means for playing, recording and reproduction of a musical selection, and a graphical screen that provides analysis, feedback and/or instructions to the player.

It will be appreciated by those skilled in the art that changes could be made to the embodiments described above without departing from the broad inventive concept thereof. It is understood, therefore, that this invention is not limited to the particular embodiments disclosed, but it is intended to cover modifications that are within the spirit and scope of the invention, as defined by the appended claims.

What is claimed is:

1. An iconographic tablature for notating music for a harmonica, comprising:
   a staff having a head portion and a tail portion, said staff aligned in a vertical direction, said vertical direction reflecting progression of time;
   a plurality of numerals located at the head of the staff, each of the plurality of numerals representing one hole of a plurality of holes of the harmonica; and
   at least one elongated demarcation aligned in the vertical direction, wherein vertical dimension of said at least one elongated demarcation reflects duration of time that a note is to be played on the harmonica, wherein one of the at least one elongated demarcation is a symbol which is deflected to bend in a plurality of patterns, each one of the plurality of patterns representing an alteration of pitch while blowing or drawing the note, said alteration of pitch including a warble represented by two symbols which are connected, a tremolo represented by a serpentine-shaped symbol, and a vibrato represented by a symbol having varying width, wherein embouchure is represented by vowel sounds, wherein a greater degree of cupping the harmonica by a player's hand represented by a stripe of decreasing width located adjacent to and substantially aligned with the notes of the staff, said cupping used to modulate music texture produced, and wherein horizontal position of said at least one elongated demarcation indicates the hole of the harmonica in which it is to be played.

2. The tablature according to claim 1, wherein color or pattern of the elongated demarcation indicates whether the note is blown or drawn.

3. The tablature according to claim 1, wherein the elongated demarcation has a shape which varies horizontally, said shape depicting modulation of pitch of the note.

4. The tablature according to claim 1, in which the elongated demarcation has a variable width, variable intensity or variable hue, each of which indicates loudness of the note.

5. The tablature according to claim 1, further comprising at least one other elongated demarcation superimposed on the at least one elongated demarcation, said at least one other elongated demarcation indicating notes played by a musician or student.

6. The tablature according to claim 1, wherein said tablature is stored and displayed on a computer.

* * * * *